3,084,989
PROCESS OF TREATING POLYVINYL ALCOHOL
Hitoshi Abe and Yasuji Ohno, Kurashiki City, Japan, assignors of one-fourth to Air Reduction Company, Incorporated, New York, N.Y., a corporation of New York, and three-fourths to Kurashiki Rayon Co., Ltd., Okayama, Japan, a corporation of Japan
No Drawing. Filed Apr. 5, 1960, Ser. No. 20,011
Claims priority, application Japan Apr. 8, 1959
9 Claims. (Cl. 8—115.5)

This invention relates to the treatment of polyvinyl alcohol in the form of fibers or other shaped objects, such as films.

It is known that, for the purpose of obtaining polyvinyl alcohol fibers or other shaped objects of high hot-water resistance and elasticity, a side-chain having a significant steric hindrance effect may be introduced into the non-crystalline portion of the polyvinyl alcohol molecule by means of higher aldehydes.

Aldehydes with four or more carbon atoms are effective as treating agents for this purpose, but as the number of carbon atoms increases, the aldehydes become more water-insoluble, and it eventually becomes very difficult to effect the desired reaction in a liquid medium consisting only of water. In order to effect acetalization by means of such water-insoluble aldehydes, a large amount of an alcohol such as methyl alcohol or ethyl alcohol is used as described in Japanese Patent No. 159,969, or surface active agents are used to emulsify and disperse the aldehydes, or to solubilie them so as to cause the desired reaction, as described in Japanese Patent No. 204,458.

However, in the case of aldehydes having a water solubility of less than 0.2% at room tempertaure, disadvantages arise which gradually render such treatment too difficult and impracticable. For example, lower alcohols such as methyl alcohol and ethyl alcohol have low boiling points and low solubilities with respect to higher aldehydes, and thus a large amount of methyl alcohol or ethyl alcohol is required to dissolve the necessary amount of aldehyde. On the other hand, an increase in the amount of methyl alcohol or ethy alcohol greatly reduces the rate of reaction, so that any increase in reaction rate which might be achieved by a greater concentration of aldehyde is offset. At the same time, the stability of the emulsion tends to become less when treatment is carried out in an emulsified and dispersed state, thus making it impossible to effect homogeneous reaction. Accordingly, acetalization by means of a higher aldehyde having a water-solubility below 0.2% at room temperature, i.e. 20–25° C. has been recognized as being extremely difficult. As a matter of fact, there has been essentially no instance of this reaction having been put into practice.

It is, accordingly, an object of the present invention to provide a process for effectively acetalizing polyvinyl alcohol by means of aldehydes which are insoluble or substantially insoluble in water.

It is another object of the present invention to provide an improved process for effecting acetalization of polyvinyl alcohol fibers, films and other shaped objects by means of higher alcohols.

It is a further object of the invention to provide a process for effectively acetalizing polyvinyl alcohol fibers, films and other shaped objects by means of aldehydes having a water-solubility less than 0.2% at room temperature.

Other objects will be apparent from the following detailed description of the invention.

In accordance with the invention, polyvinyl alcohol, suitably in the form of fibers, films, or the like, is acetalized in a solvent system comprising n-propyl alcohol or isopropyl alcohol and water, with the water being present in an amount of, at least 10% by weight of the system, acetalization being effected by means of aldehydes which are insoluble or substantially insoluble in water, e.g. having a water-solubility of at most 0.2% at 20–25° C.

The boiling points of n-propyl alcohol and isopropyl alcohol are 97.2° C. and 82.4° C., respectively, at atmospheric pressure, these boiling points being substantially higher than those of methyl alcohol and ethyl alcohol. These two propyl alcohols thus have the advantage of being adapted for treatment of fibers at a higher temperature than is possible with the two lower alcohols.

In addition, the solubility of n-propyl alcohol and isopropyl alcohol for higher aldehydes in the presence of water is much greater than that of methyl alcohol and ethyl alcohol under the same conditions. Thus, acetalization can be effected by using the alcohol at a lower concentration, with consequent greater reaction velocity.

On the other hand, higher alcohols such as butyl alcohol, and the like have low water-solubility, which makes it difficult to use them as solvents for acetalization. The solubility in water at room temperature is 9% in the case of n-butyl alcohol, 27% in the case of n-amyl alcohol, and 28% in the case of isoamyl alcohol. In such a solution, a higher aldehyde in the amount required for the reaction cannot be dissolved.

As demonstrated by use of α-naphthaldehyde, n-propyl alcohol and isopropyl alcohol have very high solubility with respect to higher aldehydes. Thus, whereas a 20% solution in water is sufficient for n-propyl alcohol to dissolve α-naphthaldehyde (156%) at 70° C. and a 25% solution in water is sufficient for isopropyl alcohol to effect the same action, a 40% solution in water is required in the case of methyl alcohol (in a sealed container) and a 35% solution in water in the case of ethyl alcohol is required for the same objective.

These relationship are important in treating fibers, films, and other shaped objects of polyvinyl alcohol by means of higher aldehydes. In carrying out treatment with higher aldehydes in a methanol system, a high concentration of methanol is required in order to raise the concentration of aldehyde to obtain reaction but this concentration of methanol will adversely lower the reaction velocity contrariwise. This disadvantage has been avoided by the present invention.

Moreover, it is difficult to raise the reaction temperature when methyl alcohol, and ethanol are used. As a result, acetalization may be carried out with benzaldehyde, and like aldehydes which react at relatively low temperatures, but in the case of a higher aldehyde such as naphthaldehyde, and the like great difficulty is experienced in effecting the reaction and it is necessary to carry out the reaction in a sealed container so as to obtain the needed higher temperature. From an industrial standpoint this is wholly impracticable. This disadvantage has been overcome by the method of the present invention.

In the following table are set forth the results of acetalization of polyvinyl alcohol fibers by means of naphthaldehyde in the presence of solvent systems which are water-solutions of different alcohols at different concentrations.

In each case, α-naphthaldehyde was used at the concentration corresponding substantially to its saturation point under the various conditions of reaction specified.

| Alcohol | Concentration of alcohol (wt. percent) in water | Concentration of sulfuric acid (wt. percent) | Concentration of α-naphthaldehyde (wt. percent) | Temp. (° C.) | Time (hr.) | Acetalization (mol percent) |
|---|---|---|---|---|---|---|
| None | 0 | 5 | ¹ 0.05 | 70 | 2 | 0.5 |
| Do | 0 | 5 | ¹ 0.05 | 80 | 2 | 1.0 |
| Methyl alcohol | 25 | 5 | 0.7 | 70 | 2 | 8.3 |
| Do | 25 | 5 | ² 0.1 | 60 | 2 | 1.0 |
| Do | 40 | 5 | 0.7 | 60 | 2 | 6.6 |
| Ethyl alcohol | 25 | 5 | 0.5 | 70 | 2 | 7.0 |
| Do | 40 | 5 | 2.8 | 70 | 2 | 1.8 |
| Isopropyl alcohol | 25 | 5 | 1.5 | 70 | 2 | 20 |
| Do | 25 | 5 | 1.5 | 75 | 2 | 25 |
| n-propyl alcohol | 25 | 5 | 1.9 | 70 | 2 | 26 |
| Do | 25 | 5 | 2.3 | 80 | 2 | 28 |
| n-butyl alcohol | 7 | 5 | 0.2 | 70 | 2 | 1.5 |
| Do | 7 | 5 | 0.3 | 80 | 2 | 2.5 |

¹ Even with 0.05% of naphthaldehyde, dissolution was incomplete.
² Even at 0.1% of naphthaldehyde, dissolution was incomplete.

As will be seen from the foregoing table, when n-propyl alcohol or isopropyl alcohol is used in the solvent system, effective acetalization becomes possible even with a higher aldehyde.

Thus, the higher solubility and higher boiling point characteristics of n-propyl alcohol and isopropyl alcohol can be utilized for highly-effective acetalization particularly in the case of aldehydes having a water-solubility below 0.2%. However, even with aldehydes of a water-solubility of 0.2%–0.5%, such as benzaldehyde, these two alcohols have the advantage of making possible this reaction with a low alcohol concentration, and at a relatively high reaction temperature. This is of great industrial significance.

While n-propyl alcohol or isopropyl alcohol are suitably used as the sole alcohol component of the solvent system, they can be used in combination with other organic substances, such as other lower alkyl alcohols, e.g. methyl alcohol, ethyl alcohol and butyl alcohol, or other organic solvents such as dioxane, dimethyl-formamide, dimethylsulfoxide, and the like.

In carrying out the present invention, any of the commercial fibers, films, or other shaped forms of polyvinyl alcohol may be employed and the invention is also applicable to such shaped forms composed of polyvinyl alcohol copolymerized with other monomers in accordance with known techniques. Similarly, fibers, films, and other shaped forms of blends of polyvinyl alcohol with other materials such as amino-acetalized polyvinyl alcohol as described in Osugi et al. U.S. Patent 2,906,594 can also be employed. The fibers, films, and other shaped objects are, of course, formed by conventional processes well known in the art as described in the above-mentioned Osugi et al. patent and in Cline et al. U.S. Patent 2,601,360.

The invention is applicable to the treatment of such shaped forms of polyvinyl alcohol by means of any higher aldehydes, e.g. aldehydes having at least 7 carbon atoms particularly the aromatic aldehydes such as benzaldehydes and naphthaldehydes. However, the process is also applicable to aliphatic aldehydes. Some examples of aldehydes effectively used in accordance with the present invention are benzaldehyde, α-naphthaldehyde, 7-formyl-1,2,3,4-tetrahydronaphthalene, p-phenylbenzaldehyde, β-cyclohexylaminobutylaldehyde, n-laurylaldehyde and the like. Thus, any higher aldehyde which will acetalize polyvinyl alcohol is suitably used with the solvent system of this invention and, as mentioned, the invention is particularly applicable to such aldehydes having a water-solubility below 0.2% although it also has important advantages for aldehydes having a water-solubility as high as 0.5%.

The solvent system contains at least 10% by weight of water but advantageously the water content is higher and it is particularly advantageous to have a water content of 75 to 80% from the standpoint of achieving optimum benefits from the process. Similarly, the content of n-propyl alcohol or isopropyl alcohol is at least 10% by weight of the solvent system, preferably at least 20% by weight and may be as high as 90% by weight although a maximum of about 35% is preferred to obtain the best advantage of the invention. When mixtures of n-propyl alcohol and isopropyl alcohol are employed they may be used in any relative relationship but the total of the two alcohols should be at least 10% by weight of the solvent system. Any temperature below the boiling point of the solvent system at atmospheric pressure may be employed and the process is preferably carried out at temperatures of 70 to 80° C. It is a feature of the invention that superatmospheric pressures are not required although such pressures may be employed if desired. Any degree of acetalization may be carried out but it is a feature of the invention that it makes possible particularly high degrees of acetalization, e.g. 20 to 30 mol percent.

The invention will be further understood from the following specific examples of practical application. However, it will be understood that these examples are not to be construed as limiting the scope of the present invention in any manner. In these examples, all parts are by weight.

Example 1

Polyvinyl alcohol fibers wet-spun by conventional methods were heat-treated in hot air at 235° C. for 3 min. at a constant fiber length. These fibers were treated in an aqueous solution consisting of α-naphthaldehyde (1.56%), sulfuric acid (5%) and isopropyl alcohol (25%) at 70° C. for 2 hours. The percentage acetalization of the fibers thus obtained was 20.3%. The shrinkage in boiling water was 5% in 30 min. The elongation and elasticity of the treated fibers was very good.

Example 2

The same polyvinyl alcohol fibers referred to in Example 1 were treated in an aqueous solution containing sulfuric acid (5%) and methyl alcohol (40%) and in which α-naphthaldehyde was dissolved until it reached the saturation point. Reaction took place at 60° C. for 2 hours. The fibers thus obtained were 6.3% acetalized, and exhibited a shrinkage of over 20% in boiling water.

In the case of an aqueous solution consisting of α-naphthaldehyde (1.56%) and methyl alcohol (40%), 70° C. is the saturating temperature for 1.56% of α-naphthaldehyde in 40% methyl alcohol. The above-mentioned fibers were treated in such a solution at 70° C. for 2 hours by using a sealed container. The percentage acetalization of the fibers thus obtained was 16%. To obtain acetalization of over 20% under these reaction conditions, over 4 or 5 hours are required.

Example 3

The same polyvinyl alcohol fibers used in Example 1 were treated in an aqueous solution composed of α-naphthaldehyde (1.56%), $H_2SO_4$ (10%) and n-propyl alcohol (20%) at 80° C. for one hour. These fibers were 21.2% acetalized and exhibited a very high hot-water resistance and elasticity.

Example 4

The polyvinyl alcohol fibers described in Example 1 were treated in an aqueous solution consisting of 7-formyl-1,2,3,4-tetrahydronaphthalene (1.6%), sulfuric acid (5%), and isopropyl alcohol (25%) at 70° C. for one hour. These fibers were 21.0% acetalized, they resisted boiling water, and exhibited excellent elasticity.

Example 5

Polyvinyl alcohol fibers wet-spun by conventional methods were heat-treated at 220° C., and hot-stretched by about 400% at 220° C. under constant fiber length. These fibers were reacted in an aqueous solution consisting of p-phenylbenzaldehyde (1.8%), sulfuric acid (10%) and n-propyl alcohol (27%) at 70° C. for 4 hours. The percentage acetalization of these fibers was 24%, and they exhibited excellent hot-water resistance and elasticity.

Example 6

Polyvinyl alcohol previously acetalized by β-cyclohexylaminobutylaldehyde was mixed with non-acetalized polyvinyl alcohol and was wet-spun in accordance with conventional procedure. The fibers were stretched by 30% 235° C. for 5 sec., and were heat-treated at 240° C. for 5 sec. at constant fiber length. The fibers thus obtained were treated in an aqueous solution cosisting of benzaldehyde (1%), sulfuric acid (2%) and isopropyl alcohol (10%) at 70° C. for one hour. The fibers were 22% benzalized and showed very good hot-water resistance, elasticity and dyeability.

Example 7

The heat-treated fibers described in Example 6 were treated in an aqueous solution composed of p-chlorobenzaldehyde (1%), sulfuric acid (2%) and n-propyl alcohol (25%) at 70° C. for one hour. The percentage acetalization of these fibers was 20%, and they showed very good hot-water resistance, elasticity, and dyeability.

Example 8

The same polyvinyl alcohol fibers used in Example 1 were reacted in an aqueous solution consisting of n-laurylaldehyde (2.0%), sulfuric acid (10%) and n-propyl alcohol (35%) at 80° C. for 2 hours. The fibers were 23% acetalized and they exhibited excellent elasticity.

Example 9

A polyvinyl alcohol film was kept under tension and heat-treated in hot air of 230° C. The film was then treated in an aqueous solution composed of sulfuric acid (10%), β-naphthaldehyde (10%) and isopropyl alcohol (20%) at 60° C. for 30 min., and a film with a high degree of water-repellency was obtained.

It will be understood that unless otherwise indicated, conventional operations are carried out in the treatment of fibers, films, or other shaped forms of polyvinyl alcohol as described above and that conventional apparatus is employed including conventional fiber and film treating apparatus. The conditions and the relative relationships set forth in the examples are those preferred in carrying out the process of the invention but it will be understood that other conditions and relationships may be used within the scope of the invention.

It will also be understood that various changes and modifications in addition to those indicated above may be made in the embodiments herein described without departing from the scope of the invention as defined in the appended claims. It is intended, therefore, that all matter contained in the foregoing description shall be interpreted as illustrative only and not as limitative of the invention.

We claim:
1. A process for improving the properties of shaped forms of polyvinyl alcohol which comprises treating such polyvinyl alcohol with an aldehyde selected from the group cosisting of aliphatic aldehydes consisting of carbon, hydrogen and oxygen atoms, aromatic aldehydes consisting of carbon, hydrogen and oxygen atoms and chloro-substituted aromatic aldehydes consisting of carbon, hydrogen, oxygen and chlorine atoms, said aldehyde having at least seven carbon atoms and having a water solubility of at most 0.5% at room temperature in a solvent system containing at least 10% by weight of water and containing at least 10% by weight of propyl alcohol.

2. A process for improving the properties of fibers of polyvinyl alcohol which comprises treating such polyvinyl alcohol with an aldehyde selected from the group consisting of aliphatic aldehydes consisting of carbon, hydrogen and oxygen atoms, aromatic aldehydes consisting of carbon, hydrogen and oxygen atoms and chloro-substituted aromatic aldehydes consisting of carbon, hydrogen, oxygen and chlorine atoms, said aldehyde having at least seven carbon atoms and having a water solubility of at most 0.5% at room temperature in a solvent system containing at least 10% by weight of water and containing at least 10% by weight of propyl alcohol.

3. A process for improving the properties of films of polyvinyl alcohol which comprises treating such polyvinyl alcohol with an aldehyde selected from the group consisting of aliphatic aldehydes consisting of carbon, hydrogen and oxygen atoms, aromatic aldehydes consisting of carbon, hydrogen and oxygen atoms and chloro-substituted aromatic aldehydes consisting of carbon, hydrogen, oxygen and chlorine atoms, said aldehyde having at least seven carbon atoms and having a water solubility of at most 0.5% at room temperature in a solvent system containing at least 10% by weight of water and containing at least 10% by weight of propyl alcohol.

4. A process for improving the properties of shaped forms of polyvinyl alcohol which comprises treating such polyvinyl alcohol with an aldehyde selected from the group consisting of aliphatic aldehydes consisting of carbon, hydrogen and oxygen atoms, aromatic aldehydes consisting of carbon, hydrogen and oxygen atoms and chloro-substituted aromatic aldehydes consisting of carbon, hydrogen, oxygen and chlorine atoms, said aldehydes having at least seven carbon atoms and having a water solubility of at least 0.5% at room temperature in a solvent system containing at least 10% by weight of water and containing at least 10% by weight of n-propyl alcohol.

5. The process of claim 4, wherein said shaped forms are fibers.

6. The process of claim 4, wherein said shaped forms are films.

7. A process for improving the properties of shaped forms of polyvinyl alcohol which comprises treating such polyvinyl alcohol with an aldehyde selected from the group consisting of aliphatic aldehydes consisting of carbon, hydrogen and oxygen atoms, aromatic aldehydes consisting of carbon, hydrogen and oxygen atoms and chloro-substituted aromatic aldehydes consisting of carbon, hydrogen, oxygen and chlorine atoms, said aldehydes having at least seven carbon atoms and having a water solubility of at least 0.5% at room temperature in a solvent system containing at least 10% by weight of water and containing at least 10% by weight of isopropyl alcohol.

8. The process of claim 7, wherein said shaped forms are fibers.

9. The process of claim 7, wherein said shaped forms are films.

References Cited in the file of this patent

UNITED STATES PATENTS

| | | |
|---|---|---|
| 2,394,689 | Heyman | Feb. 12, 1946 |
| 2,960,384 | Osugi et al. | Nov. 15, 1960 |